United States Patent
Snellman

[11] 3,717,720
[45] Feb. 20, 1973

[54] ELECTRICAL TRANSMISSION CABLE SYSTEM

[75] Inventor: Donald L. Snellman, Seattle, Wash.
[73] Assignee: Norfin, Inc., Seattle, Wash.
[22] Filed: March 22, 1971
[21] Appl. No.: 126,407

[52] U.S. Cl...............174/131 A, 57/149, 174/124 G
[51] Int. Cl................................................H01b 5/10
[58] Field of Search......174/131 A, 131 R, 130, 128, 174/126, 124, 124 G, 124 GC, 28; 57/144–151

[56] References Cited

UNITED STATES PATENTS

| | | | |
|---|---|---|---|
| 2,193,429 | 3/1940 | McConnell | 174/131 A |
| 3,309,861 | 3/1967 | Pierson et al. | 57/149 X |
| 2,325,549 | 7/1943 | Ryzowitz | 174/131 A X |
| 2,028,156 | 1/1936 | Hodson | 174/131 A |
| 1,950,858 | 3/1934 | Metcalf | 57/149 |

FOREIGN PATENTS OR APPLICATIONS

| | | | |
|---|---|---|---|
| 1,153,070 | 5/1969 | Great Britain | 174/131 A |
| 173,216 | 5/1952 | Austria | 57/146 |

Primary Examiner—Bernard A. Gilheany
Assistant Examiner—A. T. Grimley
Attorney—Seed, Berry & Dowrey

[57] ABSTRACT

A glass fiber cable is used as the tensile strength member of an overhead electrical transmission cable with the conductor wires being laid over the fiberglass cable as the core. Any configuration of conductor wires may be utilized either with or without an external insulation system on the outside of the electrical conductor.

3 Claims, 3 Drawing Figures

PATENTED FEB 20 1973 3,717,720

INVENTOR.
DONALD L. SNELLMAN

BY
ATTORNEYS

ELECTRICAL TRANSMISSION CABLE SYSTEM

BACKGROUND OF THE INVENTION

The present invention relates to an electrical transmission cable system wherein the primary tensile strength member is made up of a coreless multi-strand cable of glass fiber providing a dielectric core about which is laid the multi-strand electrical conductor and further insulation as may be required by the particular cable installation.

PRIOR ART RELATING TO THE DISCLOSURE

Although the present invention is related primarily to high voltage overhead electrical transmission lines, the principles involved have application regardless of the electrical load being carried and regardless of the type of outside insulation, if any, which is used on the transmission line. The normal design for high voltage overhead transmission lines is that of a steel cable core or tensile strength member which shares the tensile load with the conductors laid over the core. Such lines may be designed for average cross-country spans of up to 1,500 ft. between towers and even as high as 15,000 to 16,000 ft. These lines are extremely expensive to manufacture, difficult to handle and have many natural limitations due to such factors as the strength-weight ratio of the steel cable core, electrical discharge problems and the problem of reactance in the electrical line which results in high power losses over long distances.

As mentioned, the use of high tensile strength steel cables over large spans has been somewhat limited because of a poor strength-to-weight ratio. Thus, in most instances, a large percentage of the tensile load must be taken up by the conductor members themselves which are generally aluminum. Since the conductors are under tensile load, care must be taken to prevent overheating by excessive electrical loads. Another drawback related to steel cable core members is the necessity for welding since these wire cables cannot be made in continuous lengths. Because of the necessity for welding and the inability to produce endless or continuous lengths, it is necessary to make up the transmission line in several stages at different locations. The wire or steel cable must be manufactured and the necessary welds made to obtain the length desired. Following this step, the electrical conductors and insulating layers are then applied to the finished steel cable. These finished cables are extremely heavy and expensive to reel, erect and pull to construct cross-country lines.

The electrical characteristic of a transmission line having a steel core are such that a great amount of power is lost due to reactance and electrical discharge as will be understood by those skilled in the art. The present invention eliminates the problems inherent in magnetic metallic core transmission lines by providing a tensile strength core member which is itself a dielectric.

Other physical drawbacks of steel cable transmission lines most commonly occuring are those of corrosion permanent elongation or "creep" and the inability to withstand extreme temperature ranges without severe expansion and contraction. All of these factors result in metal fatigue and weakening of the tensile strength member or steel core and in ultimate failure of the line.

SUMMARY OF THE INVENTION

This invention relates to an electrical transmission cable system wherein the primary strength or tensile load member comprises a coreless, substantially homogeneous glass fiber cable with electrical conductor members helically wound or laid on the glass fiber cable as a core. In the event that external insulation is desired, any known insulation system may be applied to the layer or layers of conductor wires.

The object of the invention is therefor to provide an electrical transmission cable system wherein the primary tensile strength member comprises a homogeneous glass fiber cable which constitutes a dielectric core for a layer or layers of a metal of low density and good electrical conductivity such as aluminum or an aluminum rich alloy.

DETAILED DESCRIPTION OF THE INVENTION

Figure 1:
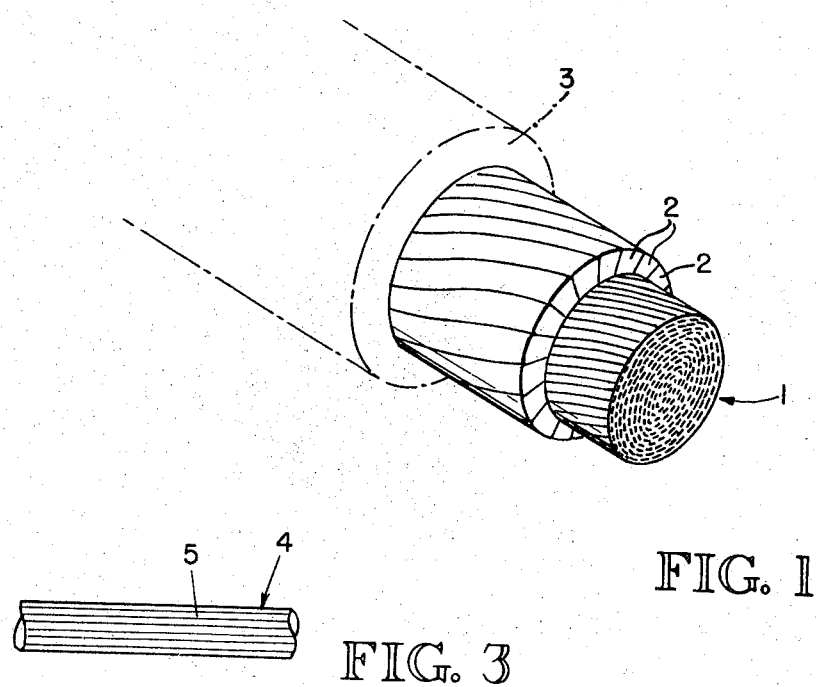
FIG. 1 is a perspective view of the cable system according to the present invention utilizing one layer of electrical conductors and FIG. 2 is a cross-sectional view of the transmission cable.

FIG. 1 illustrates one form of the present transmission cable system utilizing a single layer of electrical conductors. The glass fiber cable core member 1 is in essence a high tensile strength flexible dielectric core for the cable system which is designed to carry 75 percent to 80 percent or more of the tensile load to which the system is subjected when strung between towers. The balance of the tensile load is designed to be carried by the metallic conductor members as will be explained. The cable member of the present invention is an elastomer-impregnated glass fiber cable. The cable is made up of a plurality of individual, relatively untwisted glass fiber rovings twisted together, each of the rovings, prior to being twisted together being impregnated with an uncured elastomeric material. Each roving is made up of a plurality of individual filaments or ends. The expression "roving," "filament" and "cable" are defined for purposes of this specification as follows:

Roving — a plurality of substantially untwisted individual filaments.

Filament — a fiber of indefinite length.

Cable — an assembly of twisted together rovings.

The individual rovings are spirally twisted together in the same direction under substantially the same tension and at substantially the same helical pitch angle to produce the cable. Additional layers or spirally twisted rovings are laid on the initial rovings in concentric layers under the same tension and at the same helical angle. This process is continued until a cable of the desired diameter is achieved. Preferably, certain of the rovings making up the cable are impregnated with one component of an uncured elastomeric material and the remainder of the rovings impregnated with a curing agent or hardener for the uncured elastomer. When impregnated rovings are twisted together the two components are intimately associated resulting in a cured elastomeric material spacing the individual filaments making up the rovings and the cable from each other. The glass fiber cable resulting from this process is of homogeneous cross-section, high tensile strength, has low elongation characteristics and high strength-to-weight characteristics.

Figure 3:
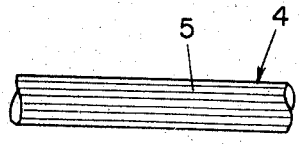
FIG. 3 is a cut away perspective view of a single roving of the subject invention.
Figure 2:
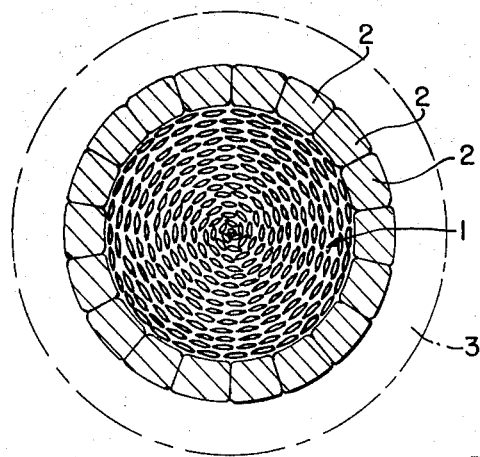

The glass fiber rovings 4 of the core member 1 consist of a group of individual filaments 5 in substantially parallel untwisted relationship as best illustrated in FIG. 3. Glass fiber roving such as that manufactured by Owens Corning Glass, Inc., is suitable. A glass fiber filament usually has a diameter ranging from 0.0,001 to 0.0,006 inches in diameter with the roving comprising 100 to 200 filaments. The elastomeric materials which may be used to individually coat each of the filaments making up the rovings are commercially available. Preferably, a two-component system is used consisting of a resin component and the curing agent or hardener for the resin component. These components are applied to separate and alternate rovings. When the separate rovings are twisted together, the resin component and the curing agent are intimately associated with each other resulting in cure of the resin. This method of impregnating the individual filaments of the cable with an elastomeric material has distinct advantages over known methods of applying resinous material to roving prior to layup of the cable. Many elastomeric materials, particularly the polyurethanes, have rapid curing times. If the components, i.e., the resin and curing agent are premixed before application to the filaments, rapidly increasing viscosity and degassing are encountered. If too long a time elapses between mixing of the components and application to the filaments the elastomeric material is substantially cured before the filaments are applied together to form a cable. By the process described such problems are eliminated. This system allows complete escape of entrained air of the polymer component with curing of the polymer delayed by the continuous fresh application of the components as each new layer of glass roving is applied over the previous layer. Excessive tackiness does not develop until after the cable has been completed. The individual filaments making up the cable are each bound to the adjacent filaments by the elastomeric material to form a cable structure having great stability and compactness, the cable structure not twisting or kinking. Further, because each filament is encased in a sheath of elastomeric material, the inherent fragility of the glass fibers, i.e., their low abrasion resistance, is protected. This along with the common helical angle of the rovings essentially eliminates internal abrasion and fracture as the cable is bent and flexed during usage.

The amounts of one or both components of the elastomeric material impregnating the rovings can be controlled. Elastomeric materials such as elastomeric polyurathenes and other known elastomeric materials can be used. Preferably a polyurathene sold under the name "Uralane" is used although similar or identical products are manufactured under various tradenames.

The finished cable comprises a plurality of individual filaments twisted together at substantially the same helical angle under constant tension. As can be seen, the cable has no starter core and is homogeneous in cross-section. A cable of any desired diameter can be fabricated according to the method described.

The electrical conductor may comprise a layer or a plurality of layers of helically laid electrical conductors 2 as illustrated in FIG. 1. These conductors will comprise a metal of low density and good electrical conductivity such as aluminum or an aluminum rich alloy. The layer or layers of conductors are preferably laid down on the surface of the fiberglass core at the same helical angle as used in twisting the rovings of the cable itself. This practice will avoid friction and wear between the surface of the fiberglass cable and the electrical conductors during handling. It will also be noted that the transmission cable may be made in a single operation or location by applying the conductor member to the surface of the cable 1 as the cable is being completed. This operation will avoid the necessity of producing the cables in desired lengths and then storing or transporting them to a different location for application of the conductors and further insulation if necessary.

Regardless of the number of layers of conductors, a suitable insulation system 3 indicated by the dotted lines may be applied to the finished transmission cable depending upon the use for which the cable is designed. Since the core member 1 is a dielectric, and hence does not interfere with the electrical characteristics of the conductor, a wide variety of insulation designs can be utilized. The specific details of any insulation system form no part of the present invention and would be well known to one skilled in the art.

Aside from the advantages discussed above, the present cable system has the advantage that, since the major portion of the tensile load is born by the dielectric core, the elongation or creep in the cable will be negligible. In addition, excessive weight on the lines due to ice formations in severe climates may be minimized by selectively increasing the voltage input on the lines so as to raise the temperature of the conductors to melt the ice. This is not possible with prior art systems since a large percentage of the tensile load had to be carried by the conductors themselves and overheating would unduly weaken the cable system. Electrical interferences caused by metal core strands used in prior cable systems can be completely eliminated by the use of the dielectric glass cable. In practice, for example, it would be possible to reduce the reactance loss to from 2 percent to 5 percent over a 500 kva line for example. Needless to say, the fiberglass core cable is completely noncorrosive and will withstand a wide temperature range without undergoing physical changes such as the elongation and contractions experienced with metal core cables. The latter advantage is of great importance in many areas where the temperature may vary from −50° to 150° C.

The embodiments of the invention in which a particular property of privilege is claimed are defined as follows:

1. A high tensile strength, low elongation electrical transmission cable of reduced reactance loss comprising:

a primary high tensile strength, homogenous, dielectric core member bearing the major portion of the tensile load of the cable when erected of substantially homogenous cross-section and made up of a plurality of glass fiber rovings twisted together, each said roving including a plurality of glass fiber filaments parallel with each other and with the longitudinal axis of said roving, each said filament being coated with a cured elastomeric sheath, said rovings being helically twisted together in the same direction under constant tension and at the same helical angle, and at least one layer of a plurality of metallic conductor strands formed on the outer surface of the core member.

2. The combination according to claim 1 including;

at least one layer of electrical insulation material formed on the outer surface of said electrically conductive material.

3. The combination according to claim 1, wherein;

said layer of electrically conductive material comprises a plurality of conductor strands helically wound in the same direction and at the same helical angle as said rovings.

* * * * *